(12) United States Patent
Meliksetian et al.

(10) Patent No.: US 8,799,854 B2
(45) Date of Patent: Aug. 5, 2014

(54) REUSING SOFTWARE DEVELOPMENT ASSETS

(75) Inventors: Dikran S. Meliksetian, Danbury, CT (US); Noshir Cavas Wadia, Morgan Hill, CA (US); Matthew Yang Wang, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1498 days.

(21) Appl. No.: 11/625,583

(22) Filed: Jan. 22, 2007

(65) Prior Publication Data

US 2008/0178147 A1 Jul. 24, 2008

(51) Int. Cl.
*G06F 9/44* (2006.01)

(52) U.S. Cl.
CPC .................................. *G06F 8/36* (2013.01)
USPC ........................................... 717/107; 717/120

(58) Field of Classification Search
None
See application file for complete search history.

(56) References Cited

U.S. PATENT DOCUMENTS

| | | | | |
|---|---|---|---|---|
| 5,581,764 A * | 12/1996 | Fitzgerald et al. | | 709/223 |
| 5,963,939 A * | 10/1999 | McCann et al. | | 1/1 |
| 6,256,774 B1 * | 7/2001 | O'Leary et al. | | 717/120 |
| 6,286,104 B1 * | 9/2001 | Buhle et al. | | 726/4 |
| 6,385,652 B1 * | 5/2002 | Brown et al. | | 709/227 |
| 6,526,387 B1 * | 2/2003 | Ruffin et al. | | 705/7.29 |
| 6,601,020 B1 * | 7/2003 | Myers | | 702/186 |
| 6,606,744 B1 | 8/2003 | Mikurak | | 717/174 |
| 6,671,818 B1 | 12/2003 | Mikurak | | 714/4 |
| 6,938,007 B1 * | 8/2005 | Iulianello et al. | | 705/34 |
| 7,260,596 B1 * | 8/2007 | Zhou | | 709/200 |
| 7,934,196 B2 * | 4/2011 | Ikeda et al. | | 717/120 |
| 2002/0029161 A1 * | 3/2002 | Brodersen et al. | | 705/9 |
| 2004/0039550 A1 * | 2/2004 | Myers | | 702/186 |
| 2004/0093589 A1 * | 5/2004 | Master | | 717/136 |
| 2004/0154000 A1 * | 8/2004 | Kasravi et al. | | 717/130 |
| 2004/0172612 A1 * | 9/2004 | Kasravi et al. | | 717/101 |
| 2005/0091366 A1 * | 4/2005 | Acharya | | 709/224 |
| 2007/0245302 A1 * | 10/2007 | Grotjohn et al. | | 717/109 |
| 2007/0271203 A1 * | 11/2007 | Delvat | | 705/400 |

OTHER PUBLICATIONS

"Digital Asset Management Using a Native XML Database Implementation," Natu, S. et al., ACM Digital Library; 2003.
"Reusable Software Components," Levine, T., ACM Digital Library; 1998.

* cited by examiner

*Primary Examiner* — Jason Mitchell
(74) *Attorney, Agent, or Firm* — Kunzler Law Group, PC

(57) ABSTRACT

For profiling and reusing software development assets, an apparatus includes an asset repository that stores assets, and functional and performance descriptions corresponding to each asset. The apparatus further includes a service planning module configured to interpret functional requirement(s) for a target application, and at least one service quality element corresponding to the functional requirement(s). The target application may be an internet-based application, and the functional requirements may be functions performed by software elements. The apparatus further includes a deployment module configured to compare the functional requirements with the stored assets to generate a solution plan. The solution plan may be a group of assets configured to perform the functional requirement(s) for the target application.

24 Claims, 8 Drawing Sheets

| 502 — Asset | A-001 (502A) |
|---|---|
| 504 — Functional description | Accept book orders |
| 506 { Perf_1 | 3 book orders/second; hosted on server X |
| Perf_2 | 60 kB communication per order; Hardware Y, protocol Z |
| Perf_3 | 200 items per order |
| Perf_4 | 256 characters per entry |

Fig 5A

| 502 — Asset | C-017 | C-018 |
|---|---|---|
| 504 — Functional description | Calculate square root | Calculate square root |
| 506 { Perf_1 | 16-bit, unsigned, 10 bit range, 6 bit resolution | 16-bit floating point real, 16-bit floating point complex |
| Perf_2 | 0.02 sec CPU time on HWC A | 0.033 sec CPU time on HWC A |
| Perf_3 | 0.06 sec CPU time on HWC B | 0.12 sec CPU time on HWC B |
| Perf_4 | range 0 - 1000 | range -1,000,000 to 1,000,000 |

Fig 5B

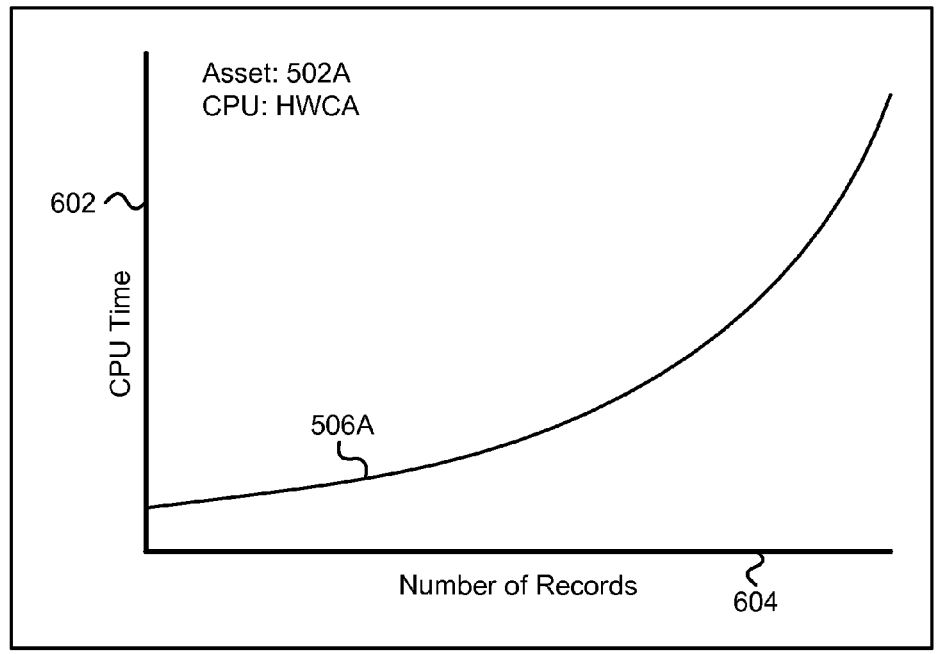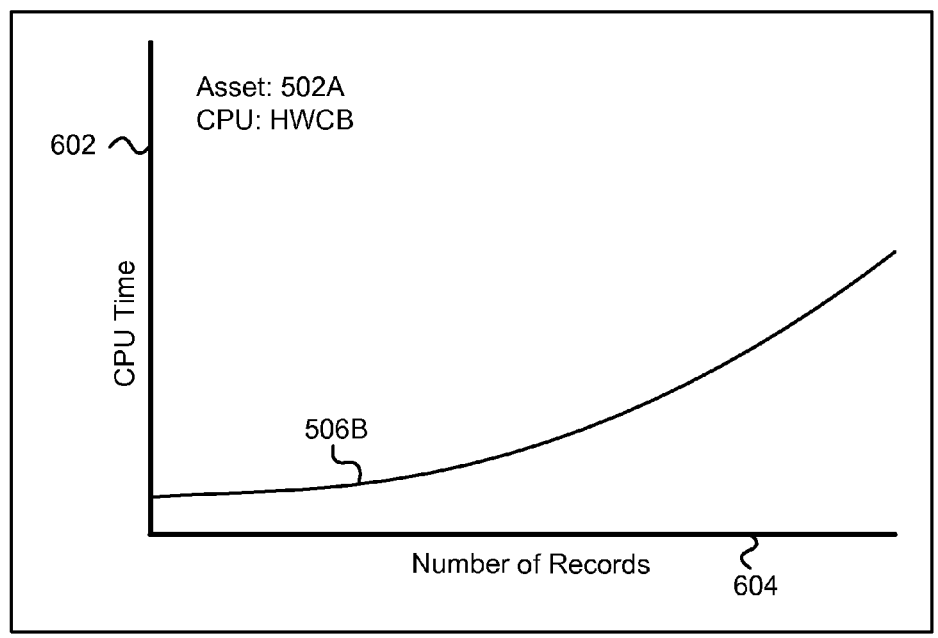
Fig. 6

REUSING SOFTWARE DEVELOPMENT ASSETS

BACKGROUND OF THE INVENTION

1. Field of the Invention

This invention relates to profiling and reusing software development assets and more particularly relates to selecting previously built software assets to be used in new implementations of internet-based applications, software applications, and business process applications.

2. Description of the Related Art

In the development cycle of new applications, software assets have often been previously created to perform functions similar to many of the features of the new application. For example, a new software application may require a special search and sort function for a particular data type, and the software asset—perhaps a search utility—to complete this function may already exist somewhere. In the business process environment, many processes to perform the functional requirements of a new application may have been performed before. For example, a new fast food restaurant may be expected to require a certain production rate of a certain mix of menu items, and various food production line design configurations may already exist and may be available for reuse. In an internet-application based environment, certain features of the online business may already be available—for example utilities to allow orders, allow new users to register, and to automatically send out newsletters.

The present technology allows some reuse of previously created assets. For example, the Rational® suite of tools includes Rational® Software Architect, Rational® ClearQuest®, and the Rational® ClearCase® Repository, and allows users to select previously created software assets with similar functionality to the functions required for a new application. However, the current asset reuse technology does not address the performance of an asset relative to a service quality element of the new application. For example, a user can select an asset that allows a website to accept book orders, but there is no information about the rate at which orders can be accepted, the size of orders allowed, or the memory used by the asset when it is incorporated to a system. The service quality elements, Quality of Service (QoS) level, or similar descriptions of the performance requirements of an asset are not accessible to a developer reviewing the stored assets.

In the current state of the art, the person reusing an asset must select assets based on a brief written description of the functionality of an asset, experience, and trial-and-error. Therefore, an expert on the assets, typically the author of the asset, is utilized to reuse particular assets. This requires more expense, time, and effort, than if a developer could select and reuse assets without expert help.

Furthermore, the expert may be well-versed in the assets available for reuse but not in the target application to be performed. For example, an expert sales person would be better suited in selecting appropriate performance criteria for a website (e.g. sales volumes, number of product lines supported, number of registered users supported, etc.) than a software asset expert, but the current technology requires a disconnect between the target application expert and the selection of assets for reuse.

Besides requiring an expert in the assets to select appropriate assets for a new application, there may be interactions between QoS elements that are not apparent even to an expert utilizing the asset. For example, an asset may be a sorting tool that sorts input data records. The time that the sorting tool requires to sort data records may depend upon the length of the data records, the number of data records, and the hardware that the sort utility is running on. These relationships may interact. For example, the sort utility may perform well with long records or with many short records, but perform poorly with many long records. A human user may have difficulty understanding that the combination of QoS elements for the prospective application may make the sort utility inappropriate for the target application even though the experience of the user indicates that the asset may have met one or more individual QoS requirements for a similar application.

SUMMARY OF THE INVENTION

From the foregoing discussion, applicant asserts that a need exists for an apparatus, system, and method for profiling and reusing development assets. Beneficially, such an apparatus, system, and method would allow a user to access the performance of the asset relative to the expected performance of an application.

The present invention has been developed in response to the present state of the art, and in particular, in response to the problems and needs in the art that have not yet been fully solved by currently available asset reuse technology. Accordingly, the present invention has been developed to provide an apparatus, system, and method for profiling and reusing development assets that overcome many or all of the above-discussed shortcomings in the art.

An apparatus is disclosed to profile and reuse functional assets. The apparatus comprises an asset repository configured to store assets and their corresponding functional and performance descriptions. The apparatus comprises a produced asset module configured to interpret and store assets in the asset repository. An asset certification module is configured to interpret and store functional descriptions corresponding to assets in the asset repository. An asset profiling module is configured to interpret and store performance descriptions corresponding to assets in the asset repository. Performance descriptions comprise models describing output performances of assets based on given inputs and hardware contexts. The apparatus further comprises a service planning module configured to interpret functional requirements, corresponding service quality elements, and hardware contexts for target applications. A deployment module is configured to generate solution plans based on comparisons of functional requirements and corresponding service quality elements with functional and performance descriptions corresponding to assets in the repository.

The deployment module is further configured to generate deficiency reports for unachievable functional requirements and service quality elements. The deployment module generates closest asset identifiers for assets closely matching unachievable functional requirements and corresponding service quality elements. The deployment module further generates deficiency indicators describing the reasons that the closest assets have unachievable functional requirements and corresponding service quality elements. The deployment module is further configured to recommend modified functional requirements and service quality elements corresponding to achievable closest asset identifiers. The apparatus further comprises a cost module configured to determine a first implementation cost corresponding to a solution plan. An optimization module is configured to determine an alternate solution plan based on functional requirements and corresponding service quality elements. The cost module is further configured to determine a second implementation cost corresponding to the alternate solution plan. The optimization module is further configured to provide a cost reduction report comprising the alternate solution plan and a recommended solution.

A method is disclosed to profile and reuse functional assets. The method may be implemented as a computer program product. The method comprises interpreting functional requirements and corresponding service quality elements for target applications. The method includes performing function comparisons to compare functional requirements and corresponding service quality elements to assets stored in an asset repository. The method further comprises generating solution plans based on function comparisons with the functional descriptions and performance descriptions corresponding to assets in the repository.

The method further includes interpreting incoming assets and functional and performance descriptions corresponding to the incoming assets. The method comprises storing incoming assets and their functional and performance descriptions in the asset repository. The method may further include determining an unachievable functional requirement having an unachievable service quality element wherein no available assets meet the unachievable service quality element. The method may include determining the asset that most closely meets the unachievable service quality element, and generating a deficiency report comprising the closest asset and the reason the closest asset does not achieve the unachievable service quality element.

A system is disclosed to profile and reuse functional assets. The system comprises an asset consumer interface that receives functional requirements and corresponding service quality elements for internet-based applications, and passes them to an asset deployment tool. The asset deployment tool is configured to store assets and their corresponding functional and performance descriptions. The system includes a service planning module configured to interpret functional requirements and corresponding service quality elements for internet-based applications. A deployment module is configured to generate solution plans based on comparisons of functional requirements and corresponding service quality elements for internet-based applications, with assets and their corresponding functional and performance descriptions stored in the deployment tool.

The system further comprises an asset producer interface that receives produced assets and their corresponding functional and performance descriptions and passes them to an asset repository. The asset deployment tool further comprises an application template module configured to determine application types based on internet-based applications, and to provide a set of basic functional requirements to the asset consumer interface according to the application type.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5A is an illustration of an asset, a functional description corresponding to the asset, and a performance description corresponding to the asset, in accordance with the present invention;

FIG. 5B is an illustration of two assets, functional descriptions corresponding to the assets, and performance descriptions corresponding to the assets, in accordance with the present invention;

FIG. 6 is an illustration of a performance description corresponding to an asset in accordance with the present invention;

DETAILED DESCRIPTION OF THE INVENTION

Figure 1:
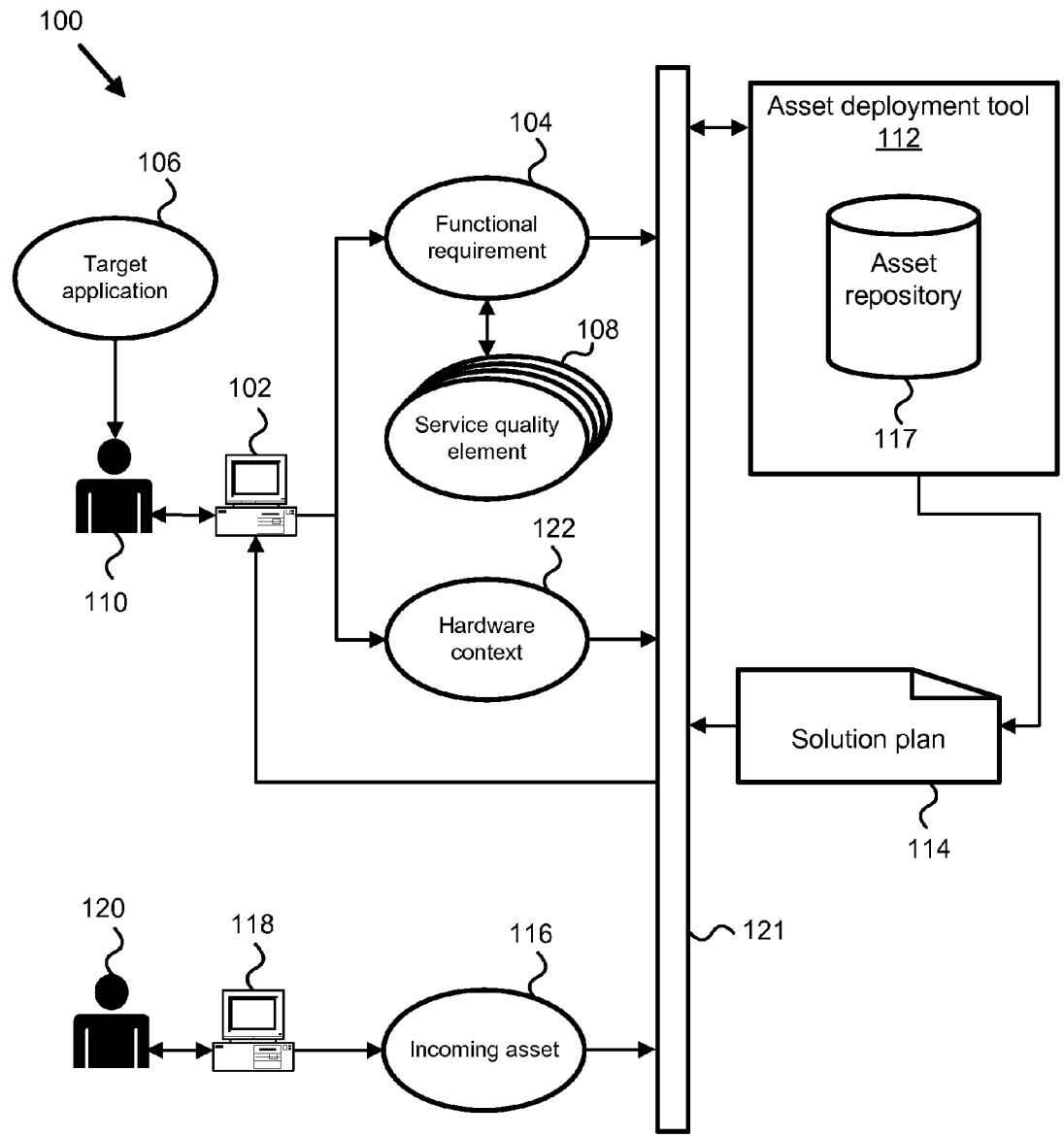
FIG. 1 is a schematic block diagram depicting one embodiment of a system to profile and reuse functional assets in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is an illustration depicting one embodiment of a system 100 to profile and reuse functional assets in accordance with the present invention. The system 100 comprises an asset consumer interface 102 that receives at least one functional requirement 104 for a target application 106. A functional requirement 104 defines what functionality the target application 106 is required to provide. The target application 106 may be an internet-based application such as an online store, subscription website, and the like. The functional requirement(s) 104 may be functional element(s) required to implement the target application 106—for example the ability to accept a customer order, to apply a sales tax to an order, to allow a user to register a new user-account, and the like. Each functional requirement 104 may comprise one discreet operation aspect of the target application 106. Functional requirements 104 may be defined based on specific functions or operations, or based on groupings of functions or operations such as those organized into particular re-usable software modules such as objects, libraries, frameworks, or the like.

In a software environment, for example, a functional requirement 104 may comprise a function, procedure, subroutine, and/or a macro. The asset consumer interface 102 may be an input/output device 102 configured to receive input signals and display output. For example, the asset consumer interface 102 may be a computer workstation 102, laptop computer 102, or other input/output device 102. Of course the input/output device 102 includes suitable hardware for receiving input and providing output to a user.

The asset consumer interface 102 of the system 100 is further configured to receive at least one service quality element 108 corresponding to each functional requirement 104, from an asset consumer 110. The asset consumer 110 may be a software developer, a customer, a client, a sales engineer, and/or a computer program configured to query the system 100 for software development assets to meet the functional requirements 104 of a target application 106. In one embodiment, each functional requirement 104 may have at least one service quality element 108 describing the performance criteria required of the functional requirement 104 to support the target application 106. The service quality element(s) may be called quality of service (QoS) capabilities. The service quality element defines a level of performance at which the functional requirement 104 must perform. The functional requirements 104 and service quality elements 108 are related in a "one-to-many" relationship, wherein each service quality element 108 corresponds to a single functional requirement 104, and wherein each functional requirement 104 relates to one or more service quality elements 108.

In one embodiment, the target application 106 may comprise a business process application 106. For example, the target application 106 may be the configuration of a point-of-sale program for a restaurant franchise. In the example, a functional requirement 104 may comprise "taking customer orders," and two service quality elements 108 for the functional requirement 104 may be "100 customers per hour" and "3 minute service time per customer."

In an alternate embodiment, the target application 106 may comprise a software application 106. For example, the target application 106 may be the development of database analysis software. In the example, each service quality element 108 corresponding to a functional requirement 104 may be a processor utilization time, a data precision level, a maximum data record size, a software asset storage size, and/or any other service quality element 108 utilized for software applications 106. For example, a functional requirement 104 may comprise "take the square root of an input," and three service quality elements 108 for the functional requirement 104 may be "range from 0 to 1,000,000," "16-bit floating point," and "0.02 seconds CPU time" (Where CPU=central processing unit). A processor utilization time may be a benchmark processor utilization equivalent, a processor utilization on a specific system, and similar parameters that may be used to standardize the processor utilization description.

In an alternate embodiment, the target application 106 comprises a network-based application 106. A network-based application 106 may be any application accessed from multiple computers and/or communication devices. For example, internet-based applications, intranet-based applications, file-transfer protocol (FTP) applications, and the like may be network-based applications 106. In one example, the target application 106 may be an on-line automobile parts store. In the example, each service quality element 108 corresponding to each functional requirement 104 may be a user throughput value, a supported number of users, a processor utilization time, a set of supported transaction types, an available bandwidth value, a number of product lines supported, an available storage space value, and/or other service quality elements 108 utilized for network-based applications 106. For example, a functional requirement 104 may comprise "accept customer orders" and two service quality elements 108 for the functional requirement 104 may be "service 99% of customer orders in less than 3 seconds" and "allow 99 items per order."

The system 100 further includes an asset deployment tool 112 that interprets the functional requirement(s) 104 and the corresponding service quality element(s) 108, and generates a solution plan 114. The asset deployment tool 112 may interpret incoming assets 116 and store each incoming asset 116, with a functional description and a performance description corresponding to each incoming asset 116 in an asset repository 117. The solution plan 114 may comprise at least one stored asset configured to meet the functional requirement(s) 104 and the corresponding service quality element(s) 108.

The asset deployment tool 112 may comprise a plurality of modules configured to functionally execute generating the solution plan 114, described in more detail below. The modules may include a service planning module, a deployment module, a produced asset module, an asset certification module, an asset profiling module. In one embodiment, the asset deployment tool 112 may comprise a cost module, an optimization module, and/or an application template module. The asset deployment tool 112 may further comprise an asset repository.

The system 100 may include an asset producer interface 118 configured to receive at least one incoming asset 116 from an asset producer 120. The asset producer 120 may comprise a software developer, a supplier, an automated input from an online asset service, and the like. For example, an online service 120 may periodically send incoming assets 116 to the system 100 to be stored in the asset repository.

In one embodiment, any and/or all of the components of the system 100 may communicate over a network 121, which may be the internet. The network 121 may comprise a corporation intranet, an Ethernet, and/or the system 100 may be included within a single computer. For example, a sales engineer 110 may visit a customer location (not shown) with a laptop 102, receive functional requirements 104 and service quality elements 108 from the customer, enter them into an asset deployment tool 112 on the laptop 102, and print a solution plan 114 to give to the customer. The sales engineer 110 may design and develop a software asset on the laptop 118, 102 and send the incoming asset 116 on to the asset repository 117 for the asset deployment tool 112 on the laptop 118, 102.

The system 100, in one embodiment, may comprise a set of communications through various means electronic and otherwise. For example, a customer 110 may phone a call center 102 that receives the functional requirements 104 and corresponding service quality elements 108 from the customer. The call center 102 may enter the functional requirements 104 and corresponding service quality elements 108 into the asset deployment tool 112 which generates a solution plan 114. The call center 102 may send the solution plan 114 to the customer 110 by mail.

The system 100 may include a hardware context 122 for the target application 106. The hardware context 122 may be an intended hardware configuration for a planned target application 106. For example, the hardware context 122 may be "Pentium IV, 3.4 GHz server, 2 GB RAM, 500 TB storage system." The hardware context 122 may be an existing hardware context 122 for an existing target application 106. For example, the hardware context 122 may be "6 Casio® PCR-T2000 Cash Registers." The hardware context 122 may be a planned upgrade or a hypothetical configuration for an existing target application 106, and may comprise any quantifiable information about the operating environment of the target application 106. The asset deployment tool 112 may be configured to assume default hardware context 122 information where the asset consumer 110 does not supply the hardware context 122, and the solution plan 114 may include any assumed or received hardware context 122 information.

The solution plan 114 of the system 100 is based on a comparison of the functional requirement(s) 104 with the plurality of assets in the asset repository 117. The asset deployment tool 112 compares the service quality element(s) 108 corresponding to the functional requirement(s) 104 with the performance description(s) corresponding to the functional description(s) of the assets in the asset repository 117. The comparison may generate a list of assets that can achieve each functional requirement 104 according to the service quality elements 108 for each functional requirement 104. For example, the asset repository 117 may comprise two assets, a first asset configured to execute credit card transactions for up to ten concurrent users and a second asset configured to execute credit card transactions for up to seventy-five thousand concurrent users. In the example, a solution plan 114 for an online bookstore website 106 requiring credit card transactions (the functional requirement 104) for fifty thousand concurrent users (the service quality element 108) may comprise the second asset configured to execute credit card transactions for up to seventy-five thousand concurrent users.

Figure 2:
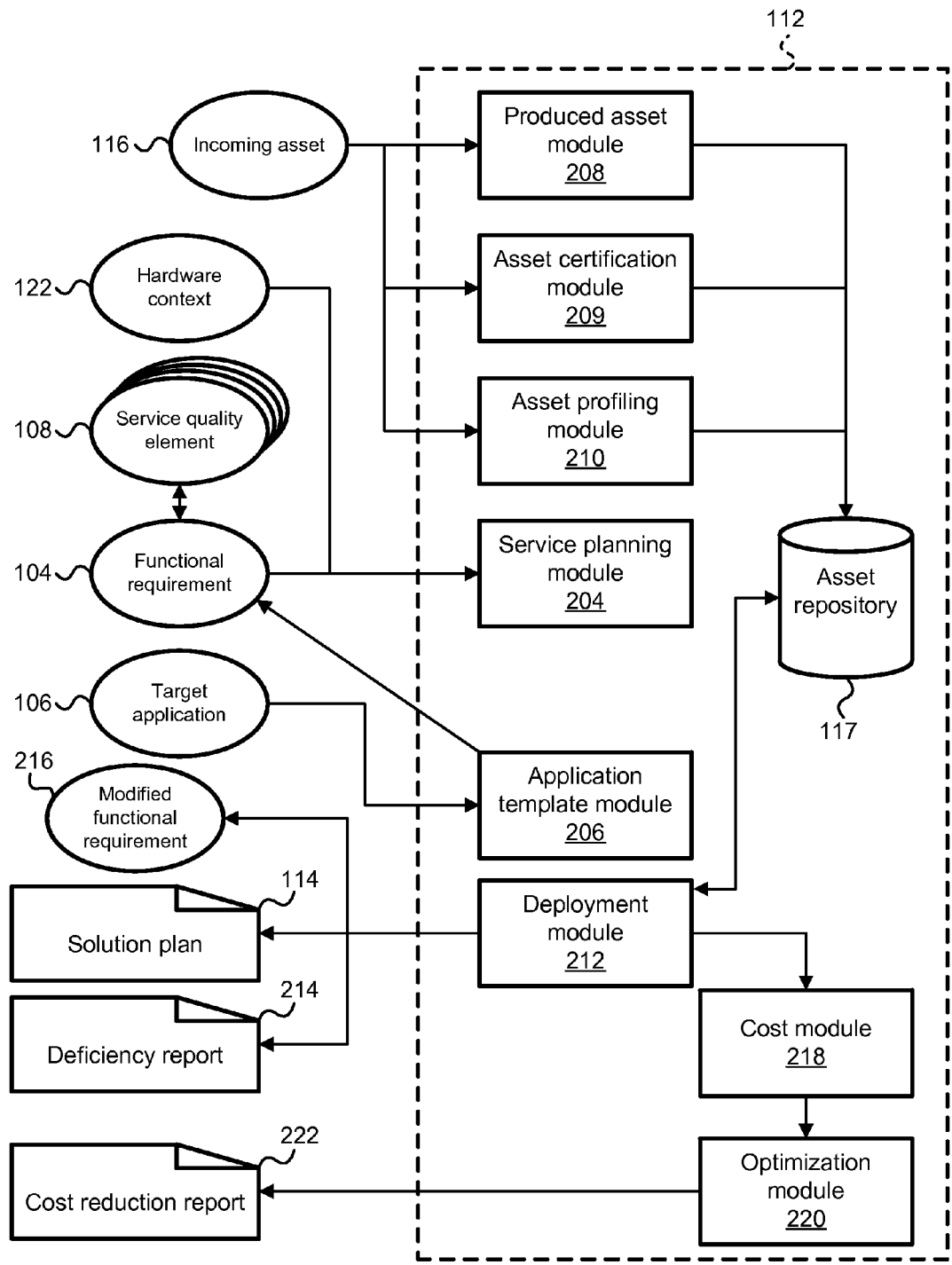
FIG. 2 is a schematic block diagram depicting one embodiment of an asset deployment tool in accordance with the present invention.

FIG. 2 is a schematic block diagram depicting one embodiment of an asset deployment tool 112 in accordance with the present invention. The asset deployment tool 112 comprises an asset repository 117 configured to store a plurality of assets, a functional description corresponding to each of the assets, and a performance description corresponding to each of the assets. The asset repository 117 may comprise a database, and the assets, functional descriptions, and performance descriptions may comprise data records and/or values within data records.

The functional descriptions may be sortable, and include descriptions accessible to a user reading them and/or descriptions accessible to an automated program that selects assets. For example, the functional description may be "performs a square root calculation," or "C13," where "C" indicates the asset is a calculation, and "13" indicates calculation 13, which may be a square root calculation. Other embodiments of storing the functionality of assets for retrieval by a person and/or a program are known in the art, and are contemplated within the scope of the present invention.

The performance descriptions include information about the asset scalability, asset data precision, asset data range, user throughput descriptions, and/or other information about the performance capabilities of the corresponding asset. The performance description may be of a similar character, or in comparable units, to the service quality elements 108. In one embodiment, the service planning module 204 prompts the asset consumer 110 to enter service quality elements 108 in units matching units available for the performance description information. For example, if an element of the performance description for an asset is "1,000 bytes," which indicates an allowed record size, the service planning module 204 prompts the asset consumer 110 to enter service quality elements 108 comprising supported record sizes in units of bytes.

In one embodiment, the performance description comprises a model describing an output performance of the corresponding asset based on a given input for the corresponding asset, and a given hardware context 122 for the corresponding asset. For example, the performance description may be a description such as "35 customers per hour per Casio® PCR-T2000 Cash Register." Thus, a number of customers that can be served for a target application 106 can be modeled from a specific hardware context 122 of the target application 106 based on the performance description. In another example, the performance description may be a description such as "1.2 seconds of CPU time, on a Pentium III 800 MHz CPU, per 10,000 data records." The model can include a non-linear equation, for example "$t=1.2*e\char`\^(r/10,000)$," where t is the CPU time and r is the number of records, on a "Pentium III 800 MHz CPU."

In one embodiment, the output performance includes a processor utilization time, a memory utilization value, a chronological processing time, and similar performance descriptions as understood for the specific incoming asset 116 and target application 106. In one embodiment, a chronological processing time is a completion time of an asset comprising a step or a process—for example an asset that completes a customer order in 30 seconds, or an asset that imposes a 0.5 second access delay irrespective of a processor utilization time that may also be part of a performance description for an incoming asset 116.

The asset deployment tool 112 further comprises a service planning module 204 configured to interpret at least one functional requirement 104 for the target application 106, and at least one service quality element 108 corresponding to each functional requirement 104 for the target application 106. In one embodiment, the service planning module 204 interprets the at least one functional requirement 104 by categorizing each functional requirement 104 for use by the asset repository 117. In another embodiment, the service planning module 204 comprises a sales engineer selecting standardized functional requirements from a catalog of standard functional requirements based on the functional requirement(s) 104 for the target application 106. The service planning module 204 in one embodiment interprets a hardware context 122 for the target application 106.

The asset deployment tool 112, in one embodiment, includes an application template module 206 that determines an application type based on the target application 106. For example, the application type may be an internet-based application. The application template module 206 provides the set of basic functional requirements 104 to the asset consumer interface 102 according to the application type.

Determining the application type based on the target application 106 may include a sales engineer determining an application type based on target application 106 information supplied by an asset consumer 110. Alternatively, an automated program selects an application type based on keywords in the target application information supplied by the asset consumer 110. In this manner the asset deployment tool 112 converts target application information into standardized application types. In one example, the target application information reads "online book store." In one embodiment, a sales engineer determines that "online vending with inventory," "OS008," or similar application types are standardized equivalents "online vending with inventory."

Providing a set of basic functional requirements 104 to the asset consumer interface 102 according to the application type may comprise prompting the asset consumer 110 to enter various functional requirements 104 according to a recommended set of functional requirements 104 related to the application type. The set of basic functional requirements 104 may be a suggested set of functional requirements 104, and/or a mandatory set of functional requirements 104. In one example, the asset type is "online book store," and the set of basic functional requirements 104 includes "sales tax calculation," "wish list generator," "order form," "product search utility," and the like. Some of the basic functional requirements 104 in the example may be required and some may be optional. The application template module 206 streamlines asset consumer 110 input and ensures that inexperienced asset consumers 110 do not leave out functional requirements 104.

FIG. 2 is a schematic block diagram depicting one embodiment of an asset deployment tool 112 in accordance with the present invention. In one embodiment, the asset deployment tool 112 includes a produced asset module 208, an asset certification module 209, and an asset profiling module 210. The asset deployment tool 112 may include an asset repository 117, a service planning module 204, and a deployment module 212. In one embodiment, the asset deployment tool 112 further includes a cost module 218 and an optimization module 220.

The produced asset module 208 interprets an incoming asset 116, and stores the incoming asset 116 in the asset repository 117 as one of the plurality of assets. The produced asset module 208 receives the incoming asset 116 from an asset producer 120 through a network 121 or similar communication mechanism. In one embodiment, the incoming asset 116 comprises software code and an asset identification such as a name and/or identification number. The produced asset module 208 stores the asset 116 in the asset repository 117, in one embodiment. The asset repository 117 comprises a database, a physical file, and/or a digital storage medium.

The asset certification module 209 interprets an incoming functional description corresponding to the incoming asset 116 and stores the incoming functional description corresponding to the incoming asset 116 in the asset repository 117. In one embodiment, the incoming functional description is incorporated with the incoming asset 116. Accordingly, the asset certification module 208 parses the incoming functional description from the incoming asset 116. In another embodiment, the asset certification module 206 may prompt the asset producer 120 for the incoming functional description when the produced asset module 208 receives an incoming asset 116. In one embodiment, the asset repository 117 comprises a set of functional description categories, and the asset certification module 210 matches the incoming functional description to one of the set of functional description categories. The asset certification module 210 in one embodiment matches the functional description and functional description category in various ways such as by accepting an input from the asset consumer 110, by matching keywords from the incoming functional description to one of the set of functional description categories, and/or by other means known in the art.

The asset profiling module 210 interprets an incoming performance description corresponding to the incoming asset 116 and stores the incoming performance description in the asset repository 117. In one embodiment, the incoming performance description is included with the incoming asset 116. The asset profiling module 210 may parse the incoming functional description from the incoming asset 116. In another embodiment, the asset profiling module 210 prompts the asset producer 120 for the incoming performance description when the produced asset module 208 receives an incoming asset 116. In one embodiment, the asset profiling module 210 executes an asset performance test on the incoming asset 116, and interprets the performance description corresponding to the incoming asset by interpreting a set of results from the asset performance test. For example, the asset profiling module 210 may execute the incoming asset 116 and track various parameters related to the asset—for example processor utilization, network traffic generated, memory utilization, and/or disk space utilization.

The deployment module 212 generates a solution plan 114 based on a comparison of the functional requirement(s) 104 and each corresponding service quality element 108 with the assets on the asset repository 117. Preferably, the deployment module 212 compares the functional descriptions corresponding to each of the assets to the functional requirement(s) 104. For example, the service planning module 204 assigns each functional requirement 104 to a functional description category according to asset consumer 110 input and/or keyword searching, and matches assets to functional requirements 104 based on the functional description categories. In one embodiment, the deployment module 212 creates a preliminary matched set of assets based on the functional description category matches.

The deployment module 212 further compares the service quality element(s) 108 corresponding to each functional requirement 104 with the performance descriptions corresponding to each of the assets on the asset repository 117. For example, the asset profiling module 210 assigns performance description categories to performance descriptions corresponding to the incoming assets 116, and the service planning module 204 assigns performance description categories to the service quality elements 108.

In one embodiment, the deployment module 212 removes assets from the preliminary matched set of assets according to whether each asset has a performance description meeting the service quality elements 108 of a functional requirement 104 according to the performance description categories and the information in the performance description. For example, an asset "Order_008" may be a member of a preliminary matched set of assets for a functional requirement "allow book orders." The functional requirement "allow book orders" may comprise a service quality element 108 of the performance description category "order rate" with a value of "70 orders per second." If the asset "Order_008" has a performance description of "60 orders per second," the deployment module 212 removes the asset "Order_008" from the preliminary matched set of assets, and the asset "Order_008" is not reported as part of the solution plan 114.

In one embodiment, the deployment module 212 generates the solution plan 114 that includes a list of all suitable assets, a list of the most capable assets, a list of the least capable assets that meet the service quality element(s) 108, and/or a list of assets selected according to preference criteria entered by the asset consumer 110. For example, if a service quality element 108 indicates that an asset should support up to a 75 megabyte (MB) file, and there are assets in the asset repository 117 supporting 100 MB, 200 MB, and 300 MB files, the deployment module 212 may select the asset supporting 100 MB files for the solution plan 114. In this example, if the asset consumer 110 enters a preference that, where available, assets should be selected that allow for growth of 50% above the service quality elements 108, the deployment module 212 may select an asset that support at least (75 MB*1.5=) 112.5 MB files, if such an asset is available. In this example, the deployment module 212 may select the asset supporting up to 200 MB files. Allowing the asset consumer 110 to enter various preference criteria, including operating margins, cost control, best/least capable assets, and the like are mechanical steps within the knowledge and skill of one of skill in the art.

In one embodiment, the deployment module 212 generates a deficiency report 214. The deficiency report 214 includes an unachievable functional requirement comprising one of the functional requirements 104 having at least one service quality element 108 that is not achievable by the assets of the asset repository 117. The deficiency report 214 may further comprise a closest asset identifier corresponding to the asset in the asset repository 117 that most closely matches the unachievable functional requirement, and a deficiency indicator that may include a reason that the service quality element 108 is not achievable by the asset that most closely matches the unachievable functional requirement.

For example, a functional requirement 104 may be "allow book orders," with a service quality element 108 of "75 customers per hour," and the closest asset matching the functional requirement 104 may have a performance description including "60 customers per hour." The closest asset may have an asset identifier of "1,678,233." The deficiency report 214 lists the unachievable functional requirement 104 "allow book orders," a closest asset identifier of "1,678,233," and a deficiency indicator of "'75 customers per hour' required, and '60 customers per hour' available." The exact configuration of messages and content in the deficiency report 214 are mechanical steps for one of skill in the art.

In one embodiment, the deployment module 212 recommends a modified functional requirement 216 comprising the unachievable functional requirement with a change in the service quality element(s) 108 that are not achievable by the asset corresponding to the closest asset identifier, such that the asset corresponding to the asset associated with the closest asset identifier can achieve the modified functional requirement 216. Continuing the previous example, the deployment module 212 may recommend a modified functional requirement 216 comprising "allow book orders" with a service quality element 108 of "60 customers per hour." In one embodiment, the deployment module 212 notifies the asset consumer 110 using the modified functional requirement 216, for example stating "recommend change in 'allow book orders' from '75 customers per hour' to '60 customers per hour.'" Alternatively, the modified functional requirement 216 is within the deficiency report 214.

The cost module 218 determines a first implementation cost corresponding to the solution plan 114. The asset deployment tool 112 may further comprise an optimization module 220 configured to determine an alternate solution plan that achieves each of the functional requirements 104 and each service quality element 108 corresponding to each functional requirement 104. The cost module 218 determines a second implementation cost corresponding to the alternate solution plan.

In one embodiment, the optimization module 220 determines an alternate solution plan that comprises an alternate functional requirement (AFR) and an alternate service quality (ASQ), where the functional requirement(s) 104 and service quality element(s) 108 comprise a base functional requirement (BFR) and a base service quality (BSQ). The optimization module 220 may be configured to provide a cost reduction report 222 comprising the alternate solution plan, a cost index, a benefit index, and/or a recommended solution based on the cost index and the benefit index.

Figure 3:
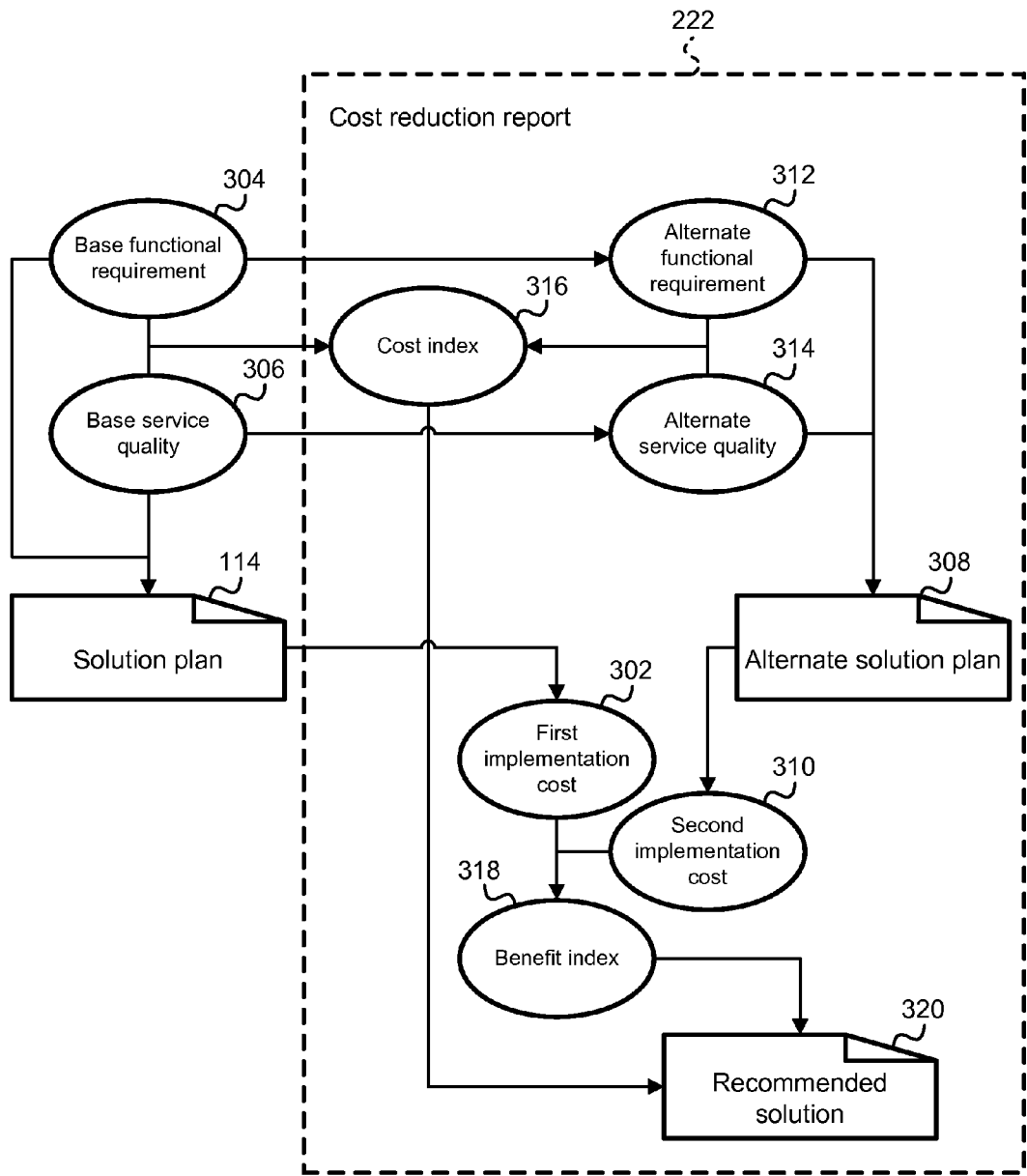
FIG. 3 is a schematic block diagram depicting one embodiment of a cost reduction report in accordance with the present invention.

FIG. 3 is a schematic block diagram depicting one embodiment of a cost reduction report 222 in accordance with the present invention. The cost module 218 may determine a first implementation cost 302 corresponding to the solution plan 114. For example, the first implementation cost 302 may comprise the cost of assembling the assets of the solution plan 114 into the target application 106. The costs may include purchasing the assets and/or copies of the assets, licensing costs associated with the assets, support and troubleshooting costs, and the like. In one embodiment, the costs include web hosting costs, and/or physical resource costs such as servers and network connectivity costs. The costs may be described in terms defined by the asset consumer 110, including without limitation dollars and/or time until implementation of the solution plan 114 and/or an alternate solution plan 308. The functional requirements 104 may comprise a BFR 304, and the service quality elements 108 may comprise a BSQ 306.

The optimization module 220 may determine an alternate solution plan 308. The alternate solution plan 308 is a set of assets that meet the BFR 304, but that comprise a different set of assets than the solution plan 114. For example, the alternate solution plan 308 may comprise the least capable assets to achieve the BFR 304, and the solution plan 114 may comprise a set of assets with an asset consumer 110 defined performance margin. The cost module 218 determines a second implementation cost 310 corresponding to the alternate solution plan 308. The optimization module 220 provides a cost reduction report 222 comprising the alternate solution plan 308. The cost reduction report 222 may include a cost savings between the alternate solution plan 308 and the solution plan 114.

In one embodiment, the optimization module 220 may determine an alternate solution plan 308 that comprises an AFR 312, and an ASQ 314 corresponding to the AFR 312. For example, the BSQ 306 may indicate that an asset should support a 75 MB file, and the asset repository 117 may comprise assets that support file sizes of 50 MB, 70 MB, and 200 MB. In the example, the solution plan 114 may comprise the asset supporting a 200 MB file. The alternate solution plan 308 may comprise an ASQ 314 of 70 MB.

The optimization module 220 may set an ASQ 314 when there is a large change in the capability of assets, when there is a large cost difference between two similarly capable assets, and/or in similar circumstances where an asset that almost meets the BSQ 306 may be a logical next best selection. In one embodiment, the optimization module 220 selects an ASQ 314 such that an almost capable asset from the asset repository 117 will be part of the alternate solution plan 308. The cost module 218 determines a second implementation cost 310 for the alternate solution plan 308, and the optimization module 220 include the alternate solution plan 308 in the cost reduction report 222.

In one embodiment, the cost reduction report 222 may further comprise a cost index 316 based on a difference between the AFR 312 and the BFR 304, and/or the difference between the BSQ 306 and the ASQ 314. For example, the BSQ 306 may comprise "75 customers per hour," and the ASQ 314 may comprise "60 customers per hour." The optimization module 220 may determine the difference between the BSQ 306 and the ASQ 314 based on criteria entered by the asset consumer 110 related to the costs associated with missing a BSQ 306 and/or a BFR 304. Suppose the asset consumer 110 indicates that each " . . . customer per hour" short of the BSQ 306 costs $0.20 per hour, that the target application 106 is expected to be active 40 hours per week, and that the discount rate (for net present value (NPV) determination) is 6%. The optimization module 220, in the example, determines that the difference between the BSQ 306 and the ASQ 314 is an NPV of about $104,000 (15 cust/hr*40 hrs/wk*$0.20/cust-hr*52 wks/yr/0.06).

The units to compare ASQ 314 and BSQ 306 information may vary with the target application 106, and are understood by one of skill in the art based on a particular embodiment of the present invention. By way of example, and without limitation, the units to compare ASQ 314 and BSQ 306 information may comprise money, time, work days, lives saved, and/or units of production. Comparisons of BFR 304 and AFR 312 information are similar to comparisons of ASQ 314 and BSQ 306. For example, a BFR 304 may indicate that six product lines should be supported in the target application 106, and the AFR 312 may support five product lines. The asset consumer 110 defines the cost associated with one less product line, and the optimization module 220 uses the information provided by the asset consumer 110 to determine the cost index 316.

In one embodiment, the cost reduction report 222 may include a benefit index 318 based on a difference between the first implementation cost 302 and the second implementation cost 310. The cost reduction report 222 may further comprise a recommended solution 320 based on the cost index 316 and the benefit index 318. In one embodiment, the recommended solution 320 may be based on the benefit index 318 compared to the cost index 316 in relative and/or absolute terms. In one embodiment, the optimization module 220 may determine the recommended solution 320 by taking assets from the solution plan 114 and the alternate solution plan 308. For example, if an asset in the solution plan 114 is high cost and/or of low marginal performance benefit, the optimization module 220 may remove that asset from the solution plan 114, add a corresponding asset having different service quality elements 108 from the alternate solution plan 308, and generate a recommended solution 320 with the resulting set of assets.

Figure 4:
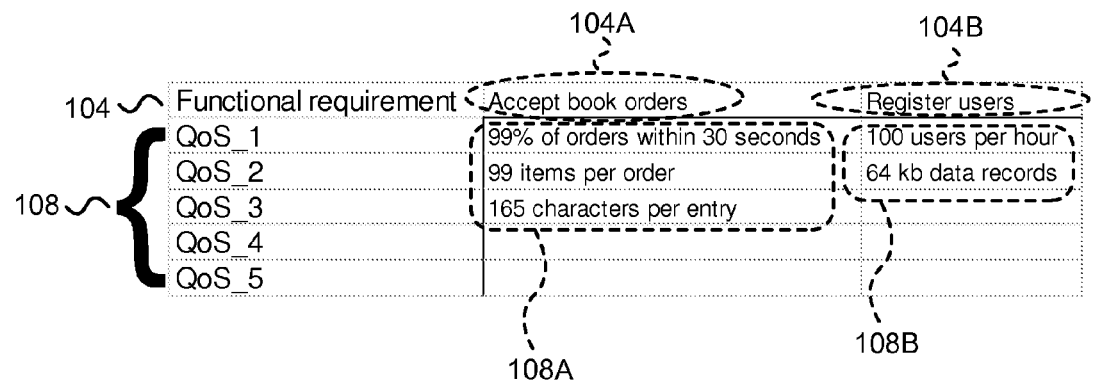
FIG. 4 is an illustration of a functional requirement and corresponding service quality elements in accordance with the present invention.

FIG. 4 is an illustration of a functional requirement 104A, 104B and corresponding service quality elements 108A, 108B in accordance with the present invention. Two functional requirements 104A, 104B are illustrated in FIG. 4. The first functional requirement 104A comprises "Accept book orders," and the deployment module 212 may present an asset consumer interface 102 to a user that allows the user to browse or search for assets from the asset repository 117 with a functional description similar to "Accept book orders," and/or a computer algorithm selects assets from the asset repository 117 based on keywords in the functional requirement 104A. In the embodiment of FIG. 4, the service quality elements 108A "99% of orders within 30 seconds," "99 items per order," and "165 characters per entry" correspond to the functional requirement 104A "Accept book orders."

The deployment module 212 may select assets from the asset repository 117 such that the selected assets have performance descriptions that meet and/or exceed each service quality element 108A, 108B for a selected matching functional requirement 104A, 104B. In one embodiment, the deployment module 212 may be configured to use standard definitions and/or prompt the asset consumer 110 for further information on a service quality element 108. For example, the deployment module 212 may be configured to prompt the asset consumer 110 for a peak order rate to define "99% of orders within 30 seconds" in the first service quality element 108A corresponding to the functional requirement 104A.

FIG. 5A is an illustration of an asset 502, a functional description 504 corresponding to the asset 502, and a performance description 506 corresponding to the asset 502, in accordance with the present invention. The illustration of FIG. 5A shows an asset identifier 502A "A-001", and a functional description "Accept book orders" 504 corresponding to the asset 502A. The deployment module 212 may match a functional requirement 104 to the functional description 504 when selecting assets 502 for generating the solution plan 114. The illustration of FIG. 5A further shows a performance description 506 (Perf_1-Perf_4) corresponding to the asset 502A. The performance description 506 may comprise a number of performance criteria, for example as shown—"3 book orders/second; hosted on server X," "60 kB communication per order; Hardware Y, protocol Z," "200 items per order," and "256 characters per entry." Each performance criteria may comprise a performance value that the deployment module 212 can compare to the service quality element (s) 108. In the examples of FIG. 5A, the server X may indicate the hardware and/or performance of a web-hosting server—for example an "Intel dual-core, Xeon-based 3.0 GHz server." The 60 kilobye (kB) communication per order may be based on Hardware Y and protocol Z, which may indicate a network card and protocol in use. For example Hardware Y may be a 10-megabit network card and the protocol may be a transmission control protocol/internet protocol (TCP/IP).

For example, a service quality element 108 may be that 75 customer orders per hour must be processed for a functional requirement 104 "accept book orders." The deployment module 212 may calculate, based on the hardware context 122 of the target application 106, whether the asset 502A "Accept book orders" can process 75 customer orders per hour using the processing time "3 book orders/second," and the bandwidth impact "60 kb communication per order." The type of information utilized in the performance description 506 depends upon the supported target application 106 types, and is within the skill of one in the art to set up given a particular target application 106 type.

FIG. 5B is an illustration of two assets 502, functional descriptions 504 corresponding to the assets 502, and performance descriptions 506 corresponding to the assets 502, in accordance with the present invention. The assets 502 in the illustration of FIG. 5B are "C-017" and "C-018", both assets 502 include a functional description 504 of "Calculate square root." The performance descriptions 506 for the assets 502 stored in the asset repository 102 may comprise fields of a database, or values corresponding to the assets stored on paper, magnetic tape, and/or other medium to store information. In one example, the database field names for the performance descriptions 506 may comprise generic names like "Perf_1," "Perf_2," etc. as shown in the illustration of FIG. 5B. The names may be pre-mapped to certain performance characteristics, for example the deployment module 212 may know that the field "Perf_1" of the asset 502 "C-017" is the data type of the output of the asset 502 "C-017." Alternatively, the database field names for the performance descriptions 506 may be independently meaningful, for example "output data type" rather than "Perf_1."

The illustration of FIG. 5B indicates that the performance description 506 of the asset "C-017" comprises "16-bit, unsigned, 10 bit range, 6 bit resolution; 0.02 sec CPU time on HWC A; 0.06 sec CPU time on HWC B; range 0-1000." In one embodiment, the Perf_1 performance description 506 field "16-bit, unsigned, 10 bit range, 6 bit resolution" may indicate that the variables used in the asset "C-017" are a data type comprising 16-bit unsigned fixed-point variables, with 10 bits dedicated to range (i.e. range 0-1024) and 6 bits dedicated to resolution (i.e. resolution of 1/64). Data types may be assigned to inputs, outputs, intermediate variables within the asset, and the like.

Likewise, data types may be listed as shown, and interpreted by the deployment module 212, and/or shown as a name. For example, "UFP10" could indicate an unsigned, fixed-point data type with 10 bits dedicated to range. The illustration of FIG. 5B indicates that the performance description 506 of the asset "C-018" comprises "16-bit floating point real, 16-bit floating point complex." In one embodiment, the Perf_1 performance description 506 field for asset C-018 may indicate that the output value of the asset C-018 has a real portion and a complex portion, each assigned a single-precision floating point value.

The illustration of FIG. 5B indicates that the performance description 506 of asset C-017 comprises "0.02 sec CPU time on HWC A" which may indicate that the asset C-017 takes 0.02 seconds to run on hardware configuration A ("HWC A"). In one example, processor utilization times may be defined in terms of the time to operate an asset on a given hardware configuration. For example, "HWC A" may comprise a ThinkPad® with a Pentium III 800 MHz processor, and "HWC B" may comprise an IBM UNIX p590 server with a 2.1 GHz POWER5+ 32-core processor. The deployment module 212 may be configured to estimate a performance of a given asset 502 based on the performance description 506 and the hardware context 122 of the target application 106. For example, the deployment module 212 may select a performance description 506 for a hardware configuration closest to the hardware context 122 as the performance estimate for the asset, and/or the deployment module 212 may interpolate between two performance description values 506 to estimate the performance of an asset 502 on the hardware context 122 to compare the performance description 506 of the asset 502 to the service quality element 108 of a functional requirement 104.

The illustration of FIG. 5B indicates that the performance description 506 of asset C-017 comprises "range 0-1000." In one embodiment, the performance description 506 may indicate that the asset "C-017" accepts input values of 0 to 1000. In the illustration of FIG. 5B, the asset "C-018" may accept input values of −1,000,000 to 1,000,000 based on the performance description 506 of asset "C-108" comprising "range −1,000,000 to 1,000,000."

The types of performance descriptions 506 and mechanisms for quantifying performance values shown in FIG. 5B are for illustration only and are not to be read as limiting the scope of the present invention. The use of other types of performance descriptions 506 and mechanisms for quantifying performance values can be developed as mechanical steps for one of skill in the art in the context of a given embodiment of the system 100.

FIG. 6 is an illustration of a performance description 506 corresponding to an asset 502 in accordance with the present invention. Each performance description may comprise a model 506A, 506B describing an output performance 602 of the corresponding asset 502A based on a given input 604 for the corresponding asset, and a given hardware context 122 HWCA, HWCB for the corresponding asset 502A. In the illustration of FIG. 6, the curve 506A comprises a model of the performance of asset 502A running on hardware configuration "A" (HWCA), where the model shows an output value of CPU time 602 utilized based on a number of records 604 sent to the asset 502A. The curve 506B comprises a model of the performance of asset 502A running on hardware configuration "B" (HWCB).

In one embodiment, the curve 506A may represent an asset 502A comprising a sort utility operating on a relatively low-end computer HWCA, and the curve 506B may represent the asset 502A operating on a relatively high-end computer HWCB. The deployment module 212 may be configured to utilize the model curve 506A, 506B corresponding to the hardware context 122 for the target application 106, and/or to interpolate between curves 506A, 506B, extrapolate from the curves 506A, 506B, and/or select a most-representative curve 506A, 506B. The curves 506A, 506B may be represented as best-fit equations, lookup tables comprising several data points, and other methods of recording model data known in the art.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
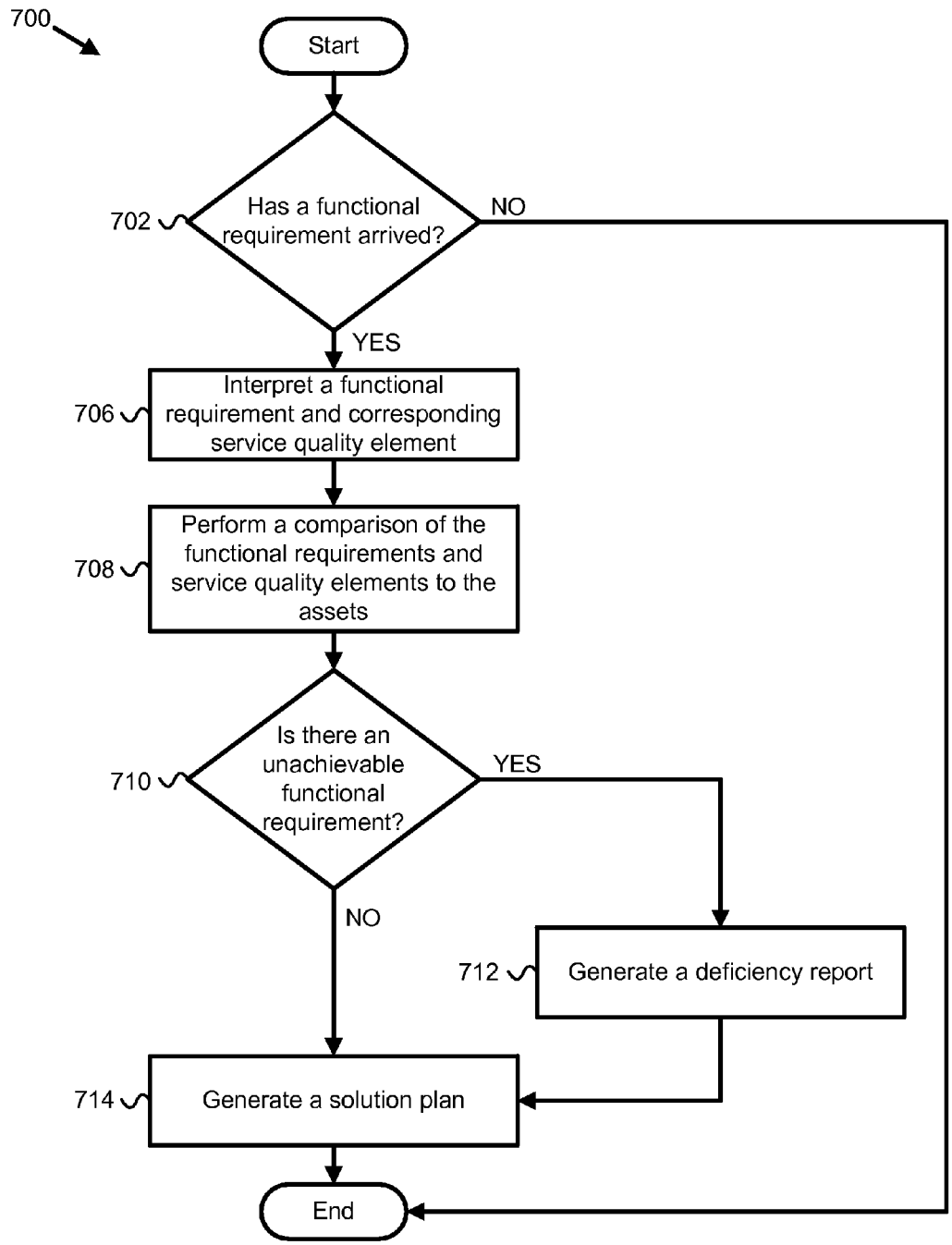
FIG. 7 is a schematic flow chart diagram illustrating one embodiment of a method for profiling and reusing functional assets in accordance with the present invention.

FIG. 7 is a schematic flow chart diagram illustrating one embodiment of a method 700 for profiling and reusing functional assets in accordance with the present invention. The method 700 may include a service planning module 204 determining 702 if a functional requirement 104 has arrived. If so, the method 700 includes a service planning module 204 interpreting 706 at least one functional requirement 104 for a target application, and at least one service quality element 108 corresponding to each functional requirement 104. The method 700 may include a deployment module 212 performing 708 a comparison of the at least one functional requirement 104, and each service quality element 108 corresponding to each functional requirement 104, to a plurality of assets stored in an asset repository 117, a functional description corresponding to each of the plurality of assets stored in the asset repository 117, and a performance description corresponding to each of the plurality of assets stored in the asset repository 117.

The method 700 may continue with the deployment module 212 checking 710 whether one of the functional requirements 104 is unachievable. If so, the deployment module 212 generates 712 a deficiency report 214 comprising a description of the reason that a closest asset does not achieve the at service quality element(s) 108 are unachievable by the plurality of assets. If not, the method 700 concludes with the deployment module 212 generating 714 a solution plan 114 based on the comparison 708.

Figure 8:
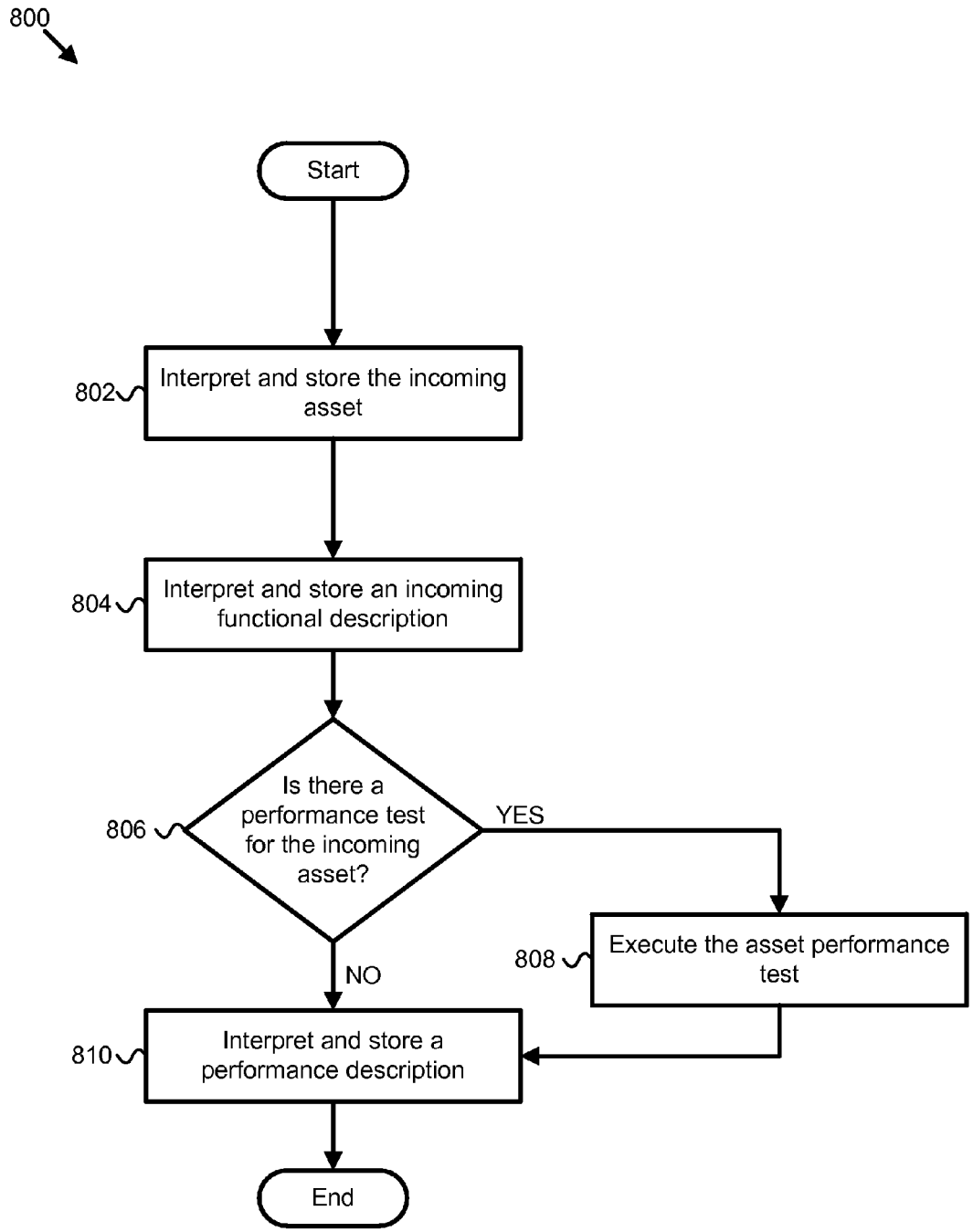
FIG. 8 is a schematic flow chart diagram illustrating one embodiment of a method for receiving an incoming asset from an asset producer in accordance with the present invention.

FIG. 8 is a schematic flow chart diagram illustrating one embodiment of a method 800 for receiving an incoming asset 116 from an asset producer 120 in accordance with the present invention. In one embodiment, the method 800 may be included as a step in a method 700 for profiling and reusing assets, for example as a function exercised by an asset deployment tool 112 when an asset producer 120 sends an incoming asset 116 to the asset deployment tool 112.

The method 800 includes the produced asset module 208 interpreting 802 the incoming asset 116, and storing the asset in an asset repository 117. In one embodiment, the asset certification module 208 interprets an incoming functional description corresponding to the incoming asset 116, and stores the incoming functional description in the asset repository 117. The asset profiling module 210 may check 806 if a performance test exists for the incoming asset 116. For example the asset profiling module 210 may check the asset identifier 502A to determine if a performance test for the incoming asset 116 is stored in the asset repository 117. The asset profiling module 210 then interprets 810 an incoming performance description 506, by executing 808 the performance test, interpreting information supplied with the incoming asset 116, and/or by prompting the asset producer 120 for some or all of the details of the performance description 506, such as for example performance ranges. In one embodiment, the asset profiling module 210 stores the performance description 506 in the asset repository 117.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a non-transitory computer readable storage medium storing computer readable program code executable by a processor, the computer readable program code comprising:
an asset consumer interface configured to:
receive a base functional requirement defining functionality provided by a target application and a base service quality element defining a level of performance at which the base functional requirement must perform;
a deployment module configured to:
interpret the base functional requirement and the base service quality element;
identify the base functional requirement as unachievable if the base service quality element is not achievable by an asset of an asset repository;
in response to identifying the base functional requirement as unachievable, recommend a modified functional requirement and a first asset that achieves the modified functional requirement, wherein the modified functional requirement is created by changing a the base service quality element not achievable by an asset to an alternate service quality element of the first asset, wherein the alternate service quality element is within a specified operating margin of the base service quality element.

2. The apparatus of claim 1, the computer readable code further comprising:
a produced asset module configured to interpret an incoming asset, and store the incoming asset in the asset repository as one of a plurality of assets;
an asset certification module configured to interpret a functional description corresponding to the incoming asset, and to store the functional description corresponding to the incoming asset in the asset repository; and
an asset profiling module configured to interpret a performance description corresponding to the incoming asset, and to store the performance description corresponding to the incoming asset in the asset repository.

3. The apparatus of claim 2, wherein the asset profiling module is further configured to execute an asset performance test on the incoming asset, and wherein interpreting the performance description corresponding to the incoming asset comprises interpreting a set of results from the asset performance test.

4. The apparatus of claim 2, the computer readable code further comprising a service planning module configured to interpret the base service quality element and a hardware context for the target application.

5. The apparatus of claim 4, wherein each performance description comprises an asset scalability, the asset scalability comprising a model describing an output performance of a corresponding asset.

6. The apparatus of claim 5, wherein the output performance comprises a member selected from the group consisting of a processor utilization time, a memory utilization value, and a chronological processing time.

7. The apparatus of claim 4, wherein the base service quality element comprises at least one member selected from the group consisting of a processor utilization time, a data precision level, a maximum data record size, and a software asset storage size.

8. The apparatus of claim 4, wherein the base service quality element comprises at least one member selected from the group consisting of a customer order throughput, a number of product lines supported, and a set of supported transaction types.

9. The apparatus of claim 4, wherein the base service quality element comprises at least one member selected from the group consisting of a user throughput value, a supported number of users, a processor utilization time, a set of supported transaction types, an available bandwidth value, a number of product lines supported, and an available storage space value.

10. The apparatus of claim 4, wherein the deployment module is further configured to generate a deficiency report comprising:
    an unachievable functional requirement comprising the base functional requirement having the base service quality element that is unachievable by the asset;
    a closest asset identifier corresponding to the first asset, the first asset most closely matching the unachievable functional requirement; and
    a deficiency indicator comprising a description of the reason the base service quality element is not achievable by the first asset.

11. The apparatus of claim 10, wherein the base service quality element is changed such that the first asset achieves the modified functional requirement.

12. The apparatus of claim 1, wherein the modified functional requirement is for the target application, comprising a member selected from the group consisting of a business process application, a software application, and a network-based application.

13. The apparatus of claim 1, the computer readable code further comprising a cost module configured to determine a first implementation cost corresponding to a solution plan and wherein the modified functional requirement and the first asset are recommended in response to the first asset having a cost savings relative to a second asset that satisfies the base service quality element.

14. The apparatus of claim 13, the computer readable code further comprising an optimization module configured to determine an alternate solution plan that achieves an alternate functional requirement and a first service quality element corresponding to the alternate functional requirement, wherein the cost module is further configured to determine a second implementation cost corresponding to the alternate solution plan, wherein the optimization module is further configured to provide a cost reduction report comprising the alternate solution plan.

15. The apparatus of claim 14:
    wherein the alternate functional requirement comprises an alternate service quality element;
    the optimization module configured to determine the alternate solution plan comprising the alternate functional requirement and an alternate service quality corresponding to the alternate functional requirement, wherein the cost module is further configured to determine second implementation cost corresponding to the alternate solution plan; and
    wherein the optimization module is further configured to provide a cost reduction report comprising the alternate solution plan.

16. The apparatus of claim 15:
    wherein the cost reduction report further comprises a cost index based on a difference between at least one of:
        the alternate functional requirement and the base functional requirement; and
        the base service quality element and the alternate service quality element;
    wherein the alternate solution plan further comprises a benefit index based on a difference between the first implementation cost and the second implementation cost; and
    wherein the cost reduction report further comprises a recommended solution based on the cost index and the benefit index.

17. A computer program product comprising a non-transitory computer readable storage medium storing a computer readable program, wherein the computer readable program when executed on a computer causes the computer to:
    receive a base functional requirement defining functionality provided by a target application and a base service quality element defining a level of performance at which the base functional requirement must perform;
    interpret the base functional requirement and the base service quality element;
    identify the base functional requirement as unachievable if the base service quality element is not achievable by an asset of an asset repository;
    in response to identifying the base functional requirement as unachievable, recommend a modified functional requirement and recommend a first asset that achieves the modified functional requirement, wherein the modified functional requirement is created by changing the base service quality element to an alternate service quality element of the first asset, wherein the alternate service quality element is within a specified operating margin of the base service quality element.

18. The computer program product of claim 17, wherein the computer readable program when executed on a computer further causes the computer to interpret an incoming asset, interpret a functional description corresponding to the incoming asset, and interpret a performance description corresponding to the incoming asset, and to store the incoming asset, the functional description, and the performance description in the asset repository as one of a plurality of assets.

19. The computer program product of claim 17, wherein an unachievable functional requirement comprises the base functional requirement having the base service quality element that is unachievable by the plurality of assets, the computer further determining the first asset from the plurality of assets that most closely matches the unachievable functional requirement and generating a deficiency report comprising a description of the reason the first asset does not achieve the base service quality element that is unachievable by the plurality of assets and wherein the modified functional requirement and the first asset are recommended in response to the first asset having a cost savings relative to a second asset that satisfies the base service quality element.

20. A system comprising:
    an asset deployment tool comprising a non-transitory computer readable storage medium storing computer readable program code executable by a processor, the computer readable program code comprising:

an asset consumer interface configured to:
receive a base functional requirement defining functionality provided by a target application and a base service quality element defining a level of performance at which the base functional requirement must perform;

a deployment module configured to:
interpret the base functional requirement and the base service quality element;
identify the base functional requirement as unachievable if the base service quality element is not achievable by an asset of an asset repository;
in response to identifying the base functional requirement as unachievable, recommend a modified functional requirement and a first asset that achieves the modified functional requirement, wherein the modified functional requirement is created by changing the base service quality element to an alternate service quality element of the first asset, wherein the alternate service quality element is within a specified operating margin of the base service quality element.

21. The system of claim 20, the computer readable program code further comprising an asset producer interface that:
receives an incoming asset, a functional description corresponding to the incoming asset and a performance description corresponding to the incoming asset, from an asset producer; and
wherein the computer readable program code further comprises:

a produced asset module configured to interpret the incoming asset, and store the incoming asset in the asset repository as one of a plurality of assets;
an asset certification module configured to interpret the functional description corresponding to the incoming asset, and to store the functional description corresponding to the incoming asset in the asset repository; and
an asset profiling module configured to interpret a performance description corresponding to the incoming asset, and to store the performance description corresponding to the incoming asset in the asset repository.

22. The system of claim 21, wherein each performance description comprises an asset scalability, the asset scalability comprising a model describing an output performance of the corresponding asset based on a given input for the corresponding asset for a plurality of hardware contexts for the corresponding asset.

23. The system of claim 20, wherein each performance description comprises at least one member selected from the group consisting of asset data precision, asset data range, and a user throughput description for the asset and wherein the modified functional requirement and the first asset are recommended in response to the first asset having a cost savings relative to a second asset that satisfies the base service quality element.

24. The system of claim 20, wherein the computer readable program code further comprises an application template module configured to determine an application type based on the target application, and to provide the base functional requirements to the asset consumer interface according to the application type.

* * * * *